BARDELL & SMITH.

Coal Scuttle.

No. 3,438. Reissued May 18, 1869.

Witnesses.
James Cochrane
John McIntyre

Inventors.
Alfred Bardell
Samuel Smith

N. PETERS, Photo-Lithographer, Washington, D. C.

UNITED STATES PATENT OFFICE.

ALFRED BARDELL AND SAMUEL SMITH, OF NEW YORK, N. Y.

IMPROVEMENT IN THE CONSTRUCTION OF COAL-SCUTTLES.

Specification forming part of Letters Patent No. 62,807, dated March 12, 1867; Reissue No. 3,438, dated May 18, 1869.

*To all whom it may concern:*

Be it known that we, ALFRED BARDELL and SAMUEL SMITH, both of the city, county, and State of New York, have invented certain new and useful Improvements in Coal-Scuttles, which are also applicable to other articles made of sheet or plate metal; and we do hereby declare that the following is a full, clear, and exact description thereof, reference being had to the drawings which accompany this specification, and to the figures and letters marked thereon.

Figure 1:
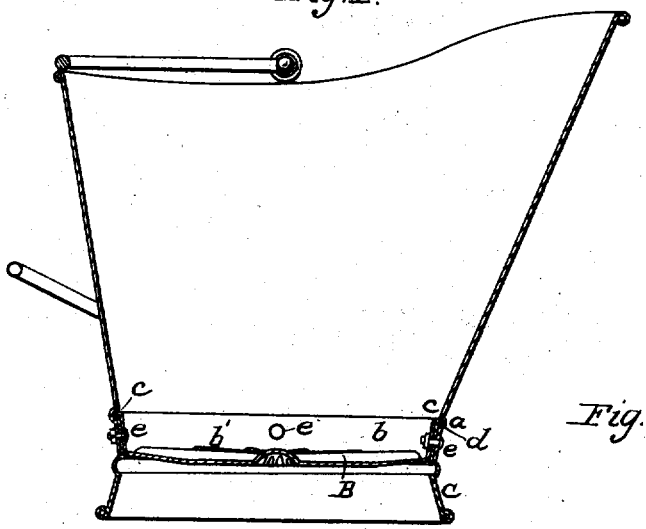
Figure 3:
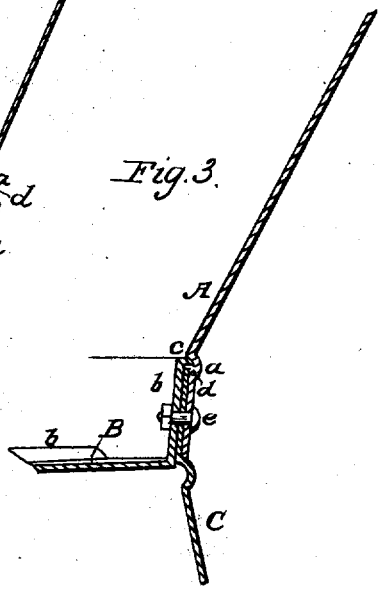
Figure 2:
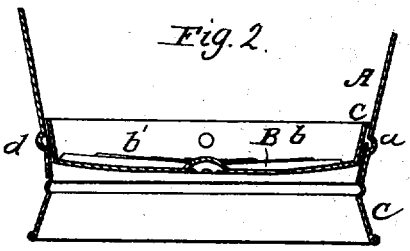
Figure 4:
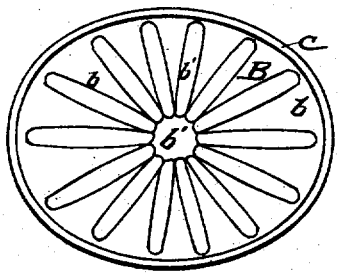

Of these drawings, Figure 1 is a vertical central section of a scuttle containing our improvements. Fig. 2 is the same view, showing the bottom in a position ready to be sprung into the recess of the bead on the body. Fig. 3 is a detached view of the joint on an enlarged scale, and Fig. 4 is a plan view of the bottom.

Similar letters of reference indicate corresponding parts in the several figures.

Coal-scuttles of ordinary construction are very liable to wear out, when in constant use, at the sides near the bottom of the body, such wear being occasioned by the moisture which so frequently accumulates in the coal and the friction which the lumps or particles of coal produce in that part of the scuttle where there is but a single thickness of metal.

The principal object of this invention is to produce a coal-scuttle which shall be more durable; and to this end our invention consists in a novel constrnction of the bottom and a novel method of uniting the bottom, the body, and the base-rim, whereby the scuttle has three thicknesses of metal in the part above referred to, where the ordinary scuttles first begins to wear out, and whereby not only are greater stiffness and strength given to the base, bottom, and lower part of the body, but the liability of wet or moisture from the interior of the body to reach the points of contact of the body, base, and bottom, and the consequent rusting of the parts, are obviated or greatly reduced.

The improvement is also applicable with equal advantage to other utensils made of sheet metal with a base-rim like that of coal-scuttles, and we therefore consider our invention as embracing, besides coal-scuttles, all such utensils.

To enable others skilled in the art to construct utensils according to our invention, we will describe the construction of a scuttle, which serves as well as any other utensil to illustrate the improvement, as no change is required to adapt it to others.

A is the body of the scuttle, having made upon the lower portion, within a short distance of the edge that comes in contact with the base-rim, a bead, *a*, which runs the whole distance round the body.

B is the sheet-iron bottom, which is struck up so as to form a rim, *b*. Upon this rim is formed a small continuous flange, as seen at *c*. When the bottom B is placed in the body A, this flange takes into the recess *d*, (Fig. 2 showing the bottom in a position ready to be sprung into its place in the bead on the body.) The body A from the bead down is made a little flaring, or the portion of the bottom (rim *b*) from which the flange projects is at a little inclination inward to the bottom proper, so as to permit of a small space existing between the body and bottom, in which is inserted the bottom rim, C, running completely up to the flange *c* of the bottom. It is plain that this construction gives three thicknesses of sheet metal at the part where it is most needed, while the weight of the scuttle is not increased; and it is exident that the wet from the contents of the scuttle will not reach the joints by reason of the springing in of the bottom, and the flange upon the edge thereof filling up the bead on the body. The bottom B is struck and corrugated in the shape, as shown in the drawings at *b′ b′*, or in any other convenient shape, which, as before stated, increases the strength and durability of the ordinary thin sheet-iron bottom. The body, bottom, and base-rim, after the bottom is sprung into the body and the upper edge of the base-rim inserted between them, as before described, can be secured together by means of screws or rivets, as shown at *e e e e*. Any one of these parts can be easily replaced if it should be required from any cause.

Having described our improvements, what we claim as our invention, and desire to secure by Letters Patent, is—.

1. The combination of a body and base-rim with a bottom so constructed as to have a flange which can be sprung into the recess formed upon the body, and thereby bring together three thicknesses of sheet metal just above the bottom of the scuttle or other utensil, substantially as and for the purpose herein described.

2. A struck-up and corrugated sheet-iron bottom, B, in combination with the body and base-rim, substantially as and for the purpose herein described.

ALFRED BARDELL.
SAML. SMITH.

Witnesses:
THEO. F. JACKSON,
J. W. J. DOLMAGE.